(12) United States Patent
Silveira

(10) Patent No.: US 8,687,040 B2
(45) Date of Patent: Apr. 1, 2014

(54) OPTICAL DEVICE WITH ELECTRICALLY VARIABLE EXTENDED DEPTH OF FIELD

(75) Inventor: Paulo E. X. Silveira, Boulder, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 708 days.

(21) Appl. No.: 12/917,345

(22) Filed: Nov. 1, 2010

(65) Prior Publication Data
US 2012/0105575 A1 May 3, 2012

(51) Int. Cl.
*H04N 5/225* (2006.01)
*G02F 1/133* (2006.01)

(52) U.S. Cl.
USPC ............................................. 348/36; 382/115

(58) Field of Classification Search
USPC .......................................................... 348/36
See application file for complete search history.

(56) References Cited

U.S. PATENT DOCUMENTS

| | | | |
|---|---|---|---|
| 5,276,537 A * | 1/1994 | Savant et al. ........................ | 359/3 |
| 5,748,371 A | 5/1998 | Cathey, Jr. et al. | |
| 6,525,302 B2 * | 2/2003 | Dowski et al. ............. | 250/201.2 |
| 6,842,297 B2 | 1/2005 | Dowski, Jr. | |
| 6,911,638 B2 | 6/2005 | Dowski, Jr. et al. | |
| 6,940,649 B2 | 9/2005 | Dowski, Jr. | |
| 7,115,849 B2 | 10/2006 | Dowski, Jr. et al. | |
| 7,180,673 B2 | 2/2007 | Dowski, Jr. | |
| 7,218,448 B1 | 5/2007 | Cathey, Jr. et al. | |
| 7,260,251 B2 | 8/2007 | Dowski, Jr. et al. | |
| 7,379,613 B2 | 5/2008 | Dowski, Jr. et al. | |
| 7,859,640 B2 * | 12/2010 | Galstian et al. ................ | 349/200 |
| 8,149,377 B2 * | 4/2012 | Presniakov et al. ........... | 349/200 |
| 2008/0187749 A1 * | 8/2008 | Cael et al. ...................... | 428/354 |
| 2010/0079659 A1 * | 4/2010 | Ono .............................. | 348/345 |
| 2012/0281280 A1 * | 11/2012 | Buehler et al. ........... | 359/489.01 |

* cited by examiner

*Primary Examiner* — Sath V Perungavoor
*Assistant Examiner* — Howard D Brown, Jr.
(74) *Attorney, Agent, or Firm* — Lathrop & Gage LLP

(57) ABSTRACT

A system and method for providing an optical device with a variable extended depth-of-field (EDOF). The optical device includes an optically transparent liquid crystal layer, an optically transparent phase mask, optically aligned with the liquid crystal layer and separated therefrom by an optically transparent substrate, an optically transparent index-matching layer, disposed adjacent to one surface of the phase mask, and having a refractive index substantially matching that of the phase mask; and a pair of electrodes for generating an electric field acting on said liquid crystal layer to change the depth of field of the imaging system in proportion to the amplitude of a signal applied to the electrodes.

40 Claims, 7 Drawing Sheets

OPTICAL DEVICE WITH ELECTRICALLY VARIABLE EXTENDED DEPTH OF FIELD

BACKGROUND

Extended depth-of-field (EDOF) provides camera users with an increased range over which objects are in focus. However, this range comes at the cost of a drop in modulation transfer function (MTF) at a given range of conjugates. The traditional method of solving this problem is by providing cameras with an aperture stop with controllable diameter, such as an iris. However, an iris requires a large, bulky and relatively expensive element that is practical only in large cameras, and is not practical in ultra-compact cameras, such as cell phone cameras. Also, an iris achieves an increased depth of field by effectively increasing the lens focal ratio, with a corresponding result of reducing the amount of light reaching the lens and camera sensor by an amount proportional to the reduction in the area of the aperture. Thus, there is a need for systems and methods capable of providing camera users with variable amounts of EDOF with enough flexibility to adapt to different imaging situations.

The following U.S. Patents provide information about wavefront coding, and are incorporated by reference in their entireties: U.S. Pat. Nos. 5,748,371, 6,525,302, 6,842,297, 6,911,638, 6,940,649, 7,115,849, 7,180,673, 7,218,448, 7,260,251, 7,379,613.

SUMMARY

The present optical device provides an optical imaging system, such as a camera, with extended depth-of-field (EDOF) and allows the amount of EDOF to be varied (or removed altogether), yielding images with relatively sharp detail over a variable range of distances. For example, when taking a picture of a landscape, the EDOF function can be turned off, and when taking a picture of a fast moving subject (e.g., in sports activities) a large amount of EDOF can be provided.

In one embodiment, the optical device includes an optically transparent liquid crystal layer, an optically transparent phase mask, optically aligned with the liquid crystal layer and separated therefrom by an optically transparent substrate, an optically transparent index-matching layer, disposed adjacent to one surface of the phase mask, and having a refractive index substantially matching that of the phase mask; and a pair of electrodes for generating an electric field acting on the liquid crystal layer to change the depth of field of the imaging system in proportion to the amplitude of a signal applied to the electrodes.

DETAILED DESCRIPTION

Figure 1A:
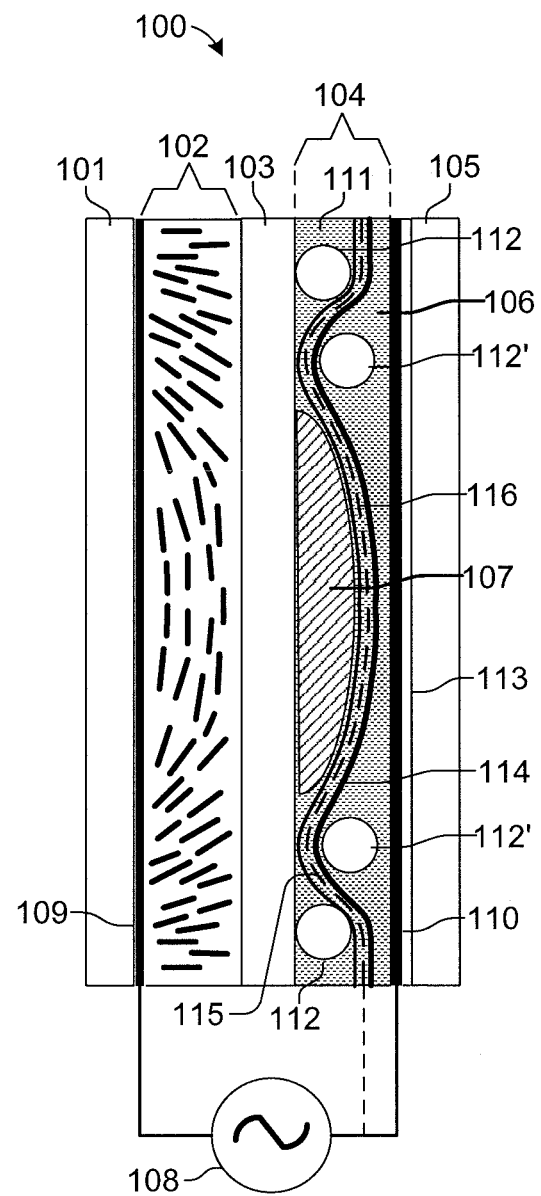
FIG. 1A is a diagram showing a prior art tunable liquid crystal lens.

FIG. 1A is a diagram showing a prior art tunable liquid crystal lens 100. Lens 100 has a liquid crystal (LC) layer 102, and a 'hidden' layer 104 with a core lens 107. Layer 104 is optically transparent and induces an electric field in LC layer 102 that is shaped proportionally with respect to the shape of the core lens 107. Core lens 107 is fabricated from an optically transparent material. Focusing of lens 100 is performed by controlling the amplitude and/or the frequency of a signal applied to electrodes 109/110 via power source 108.

LC materials typically present polar molecules that are fairly mobile and, therefore, respond to the presence of an electric field by realigning their poles along the direction of the field. Also because of the polar nature of LC molecules, when they are poled (that is, their molecules are aligned along a preferred axis) they present refractive indices that are dependent on the polarization of light that is transmitted through them. When light is polarized perpendicularly to the average direction of orientation of the LC molecules, $n_{eff}=n_o$ (i.e., the effective index of refraction $n_{eff}$ is substantially close to $n_o$, the ordinary index of refraction of the material) and no optical retardation takes place. When light is polarized at any other direction (or, conversely, when the LC molecules change their average direction of orientation), $n_{eff}$ takes a value between $n_o$ and $n_e$, the extraordinary index of refraction. In that case, transmitted light experiences an optical retardation that spatially varies, and is proportional to the difference between $n_o$ and $n_{eff}$ and the thickness of the optical material.

The spatial variation in optical retardation is an effect that allows one to spatially modulate the phase (that is, the wavefront) of light transmitted through the tunable LC lens 100 and, therefore, achieve tunable focusing power. The localized amount of phase retardation at position x, $\Delta\theta(x)$, can be determined by the following equation:

$$\Delta\theta(x)=2\Pi(n_{eff}-n_o)t(x)/\lambda$$

where t(x) is the localized thickness of the LC material and λ is the wavelength of light in a vacuum.

Power source 108 is modulated at a frequency over which LC cell 102 presents a strong response, in the range of 100 Hz to 100 kHz, at an applied voltage of approximately 28 volts, for a typical ferro-electric LC material. Power source 108 induces an electric field in LC layer 102 resulting in the re-orientation of the average direction of the long molecular axes of the polar LC molecules. This re-orientation of the LC molecules causes a change in the effective index of refraction of the LC material to a new effective value, $n_{eff}$, and affects the modulation of the wavefront accordingly. One example of a controller for driving power source 108 is a Summit Microelectronics model SMB274 programmable AF driver.

Lens 100 includes three flat, rigid transparent (e.g., glass) substrates 101, 103, 105, with a first cell gap 102 defined between substrates 101 and 103, and a second cell gap 104 defined between substrates 103 and 105. Lens 100 further includes an LC layer 102 arranged within cell gap 102. Cell gap 104 includes a hidden lens-shaped element (core lens) 107 made of transparent dielectric material, such as an optical adhesive, having a substantially convex surface mating with two index-matching layers 106 and 111, as shown. Optical adhesives present high light transmission, low scatter, and uniform index of refraction. An optical adhesive is typically a liquid that is set in a required shape or form and then solidified by curing through a chemical reaction or a physical effect, for example, a liquid photopolymer that cures when exposed to ultraviolet light. A suitable example of such an adhesive is Norland Optical Adhesive 61 (NOA 61), manufactured by Norland Products, Inc.

Layers 106 and 111 are optically transparent index-matching layers characterized by a refractive index substantially matching that of the lens-shaped element 107. An optically transparent material (e.g., an adhesive) of a substantially annular or square shape is positioned between first substrate 103 and layer 114 to provide an index-matching layer 111 with a refractive index substantially matching that of element 107. An alignment layer 116 (shown by a dashed line) made of an appropriate material (e.g. SiOx or Polyimide) is arranged between layer 111 and layer 106.

Alignment layer 116 is provided on a thin, optically transparent, fourth substrate 114 having a non-planar shape (convex in the FIG. 1 example) for imparting a non-planar profile (e.g., concave in the FIG. 1 example) to layer 106. Substrate 114 may be a flexible sheet initially provided with the alignment layer 116 and then formed into the non-planar shape. Lens 100 further includes a first, flat and optically transparent electrode 109 made of transparent conductive material (e.g., ITO) provided on the inner surface of substrate 101, and a second, similar optically transparent electrode 110 provided on the inner surface of substrate 105.

Lens 100 further includes an alignment layer 113 arranged between layer 106 and substrate 105, by covering electrode 110 with an appropriate material (e.g. SiOx or Polyimide) facing layer 106. Optionally, an intermediate optically transparent electrode 115 may be provided on substrate 114, thereby giving electrode 115 a non-planar shape. Electrodes 109 and 110, or alternatively, electrodes 109 and 115, function to generate an electric field, the shape of which is determined by the shape of core lens 107, acting on LC layer 102 to change optical parameters of lens 100.

The dielectric constants of core lens 107 and index-matching layer 111 are substantially different, even though their indices of refraction are substantially matched. This results in electric fields induced in the LC layer 102 at RF frequencies (e.g., $10^2$ to $10^5$ Hz) that are very pronounced. For example, core lens 107 may be made of NOA 61 with a cured index of refraction 1.56 and a dielectric constant of 4.04 while the index-matching layer may be made from another optical adhesive, for example, Opti-tec 5012 (manufactured by Intertronics Co., UK), with a cured index of refraction also of 1.56 and a dielectric constant of 3.1.

In one embodiment, layer 111 includes one or more rigid, inner-cell spacers 112 extending along its periphery, and layer 106 similarly includes one or more rigid, outer-cell spacers 112' extending along its periphery.

Figure 1B:
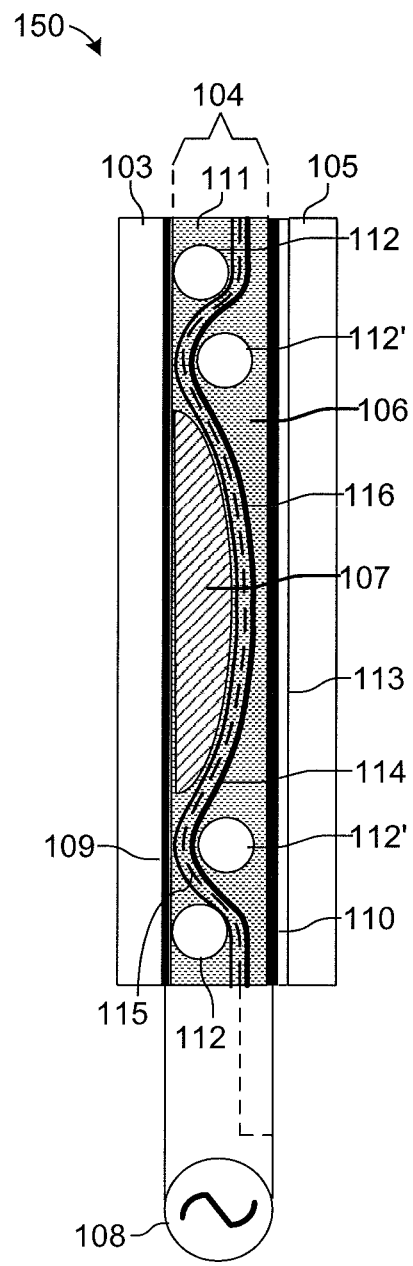
FIG. 1B is a diagram showing an alternative prior art tunable liquid crystal lens.

FIG. 1B is a diagram showing an alternative prior art tunable liquid crystal lens 150. Lens 150 is similar to lens 100 (FIG. 1A) except for substrate 101 and LC layer 102, which are eliminated, with the LC layer 106 in lens 150 replacing the functionally corresponding LC layer 102 in lens 100. Focusing of lens 150 is performed by controlling the amplitude or frequency of the signal applied to electrodes 109/110 (or 115) via power source 108.

An optional intermediate optically transparent electrode 115 may be provided on substrate 114, thereby giving electrode 115 a non-planar shape. Electrodes 109 and 110, or alternatively, electrodes 109 and 115, function to generate an electric field acting on LC layer 106 to change optical parameters of lens 100. In one embodiment, layer 111 optionally includes one or more rigid, inner-cell spacers 112 extending along its periphery, and layer 106 similarly includes one or more rigid, outer-cell spacers 112' extending along its periphery.

Figure 2A:
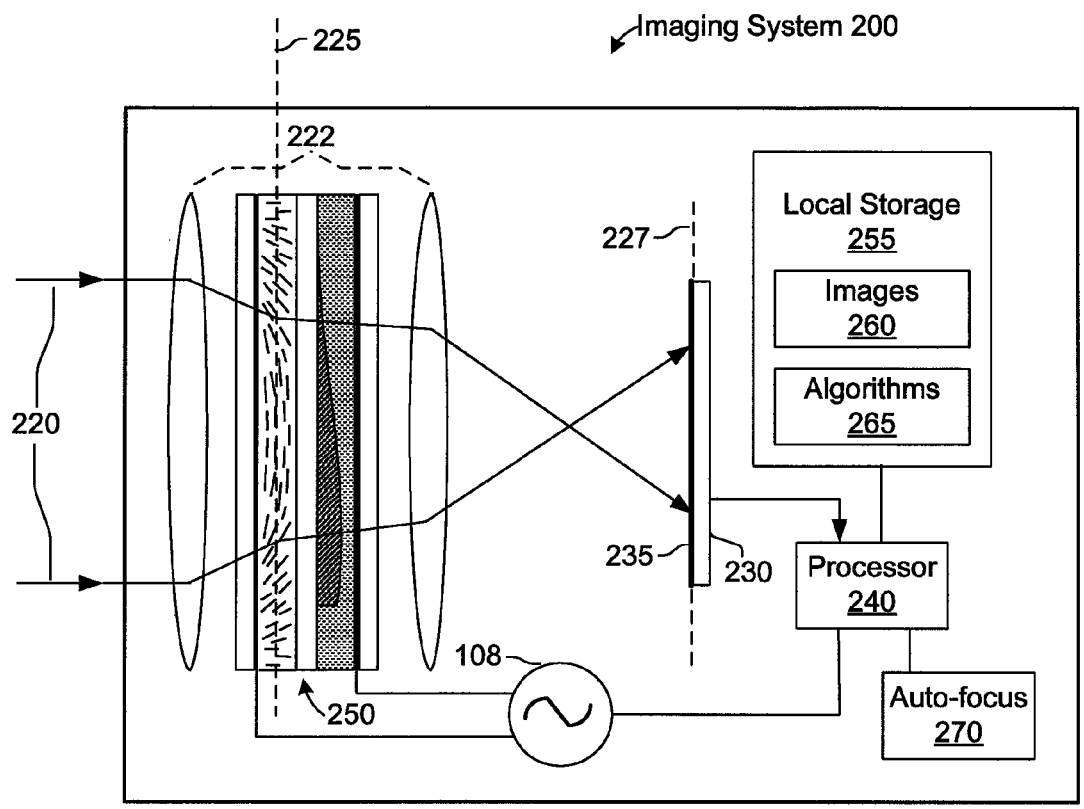
FIG. 2A is a high-level diagram showing an exemplary imaging system employing the optical device of the present system.

FIG. 2A is a high-level diagram showing an exemplary imaging system 200 employing an optical device 250 in accordance with the present optical system. As shown in FIG. 2, a lens system 222 including optical device 250 is placed at or near the aperture stop 225 of the lens system, with an optical sensor 230, such as a CCD or CMOS device, located at the pupil plane 227 of device 250.

In one embodiment, imaging system 200 comprises an on-board (on-chip) processor 240 with local storage (memory) 255. Memory 255 may be used, for example, to store pre- and post-processing images 260, as well as coded image processing and other algorithms 265. Processor 240 controls power source 108 in accordance with image processing algorithms as explained in detail below. Auto-focus element 270 can be a LensVector liquid crystal AF element or a traditional AF system.

Wavefront-Coded Imaging

Wavefront coding modifies a sensor-based optical system in such a manner as to preserve certain aspects of the image being formed in the presence of optical aberrations such as defocus. Signal processing is employed to decode an intermediate image formed on the sensor. The signal processing is determined by the coding that is impressed on the wavefront by the system optics by use of a phase mask (such as element 307 in FIGS. 3A/3B, described below). This signal processing takes into account the spatial integration provided by the width, height, and spacing of the sensor's pixel array. The final image in a wavefront-coded system is the combined result of the optics that encode the wavefront and the signal processing that decodes the intermediate image to form the final image.

More specifically, in wavefront coding, a suitable optical transfer function for a lens is created by use of a specifically-designed phase mask ('wavefront-coded' element) to produce point-spread functions of images having manipulatable information such as depth of field. The phase mask causes the optical transfer function to remain substantially constant within some range away from the in-focus position. Digital processing undoes the optical transfer function modifying effects of the mask, resulting in the resolution of an in-focus image over an increased depth of field provided by the wavefront-coded element. Depth of field post-processing is performed on the stored image to restore the image by reversing the optical transfer alteration accomplished by the mask.

A phase mask for extending the depth of field of an optical system may be constructed by examining the ambiguity functions of candidate mask functions to determine which particular mask function has an optical transfer function which is closest to constant over a range of object distances, and manufacturing a mask having the mask function of that particular candidate.

The present method employs a core optical element in the form of a phase mask (e.g., phase mask 307 in FIGS. 3A/3B, described below) to modify an incoherent imaging system (employing optical device 300) in such a way that the point-spread function (PSF) is tolerant to misfocus, while the optical transfer function (OTF) has no regions of zero values within its passband of interest, thus allowing digital processing to be used to restore the sampled intermediate image. Furthermore, because the OTF is consistent over a wide range of misfocus, the same digital processing restores the image over the wide range of misfocus. This combined optical-digital system produces a PSF that is comparable to that of the diffraction-limited PSF but over a far larger region of focus. The term 'wavefront coding' is used herein to describe the general process of modifying the incoherent optical system and the received incoherent wave front by means of a phase mask. By modifying only the phase of the received wavefront, specific wavefront coding techniques allow variable EDOF to be achieved without the loss of light.

In the embodiments shown in FIGS. 3A-3D (described below), core lens 307/337 functions as a phase mask, which takes the form of an EDOF surface, for example, a cubic.

Equation 1, below, describes the form of a cubic phase mask:

$$z = \alpha(x^3 + y^3),\quad\text{Equation 1}$$

where $\alpha$ is a scaling constant used to control the maximum amount of wavefront modulation, and x and y are spatial coordinates perpendicular to the optical axis.

If an optical surface with the form mathematically described by Equation 1 is placed at or near the aperture stop of a lens system, such as that shown in FIG. 3, or if that form is added to the surface of an existing lens near the aperture stop, the depth of focus of the system can be extended. Each type of phase mask has an operating range over which there is an extended depth of field. In Equation 1 above, which describes a simple cubic phase system, this range is determined by the value of $\alpha$.

The deconvolution kernel used to decode the image must be a function of the amplitude of the signal applied to the device. That is, larger amplitudes require larger kernels. Amplitude vs. kernel mapping can be accomplished by measuring the point spread function (PSF) of the device as a function of the amplitude of the applied voltage. Once the PSFs are known, then a filter can be applied using known techniques. For example, a Wiener filter can be applied [Fales et. al., "Wiener restoration of sampled image data: end-to-end analysis," J. Opt. Soc. Am. A, vol. 5, no. 3, pp. 300-314 (1988)].

Different EDOF phase mask forms (e.g., phase masks 307/337 described below) can be implemented in accordance with the present optical system, depending on the specific application. In addition, image sensor 330 may be programmed to activate/deactivate the EDOF function depending on imaging conditions (e.g., turned off for panoramas, set to a maximum value for action shots, or set in-between for other imaging conditions).

Figure 2B:
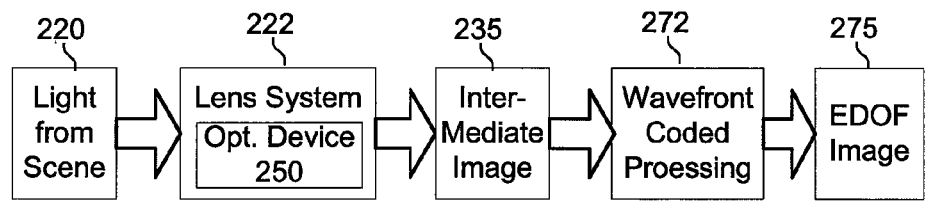
FIG. 2B is a diagram showing an exemplary high-level set of steps performed by the method used with the present system.

FIG. 2B is a diagram showing an exemplary high-level set of steps performed by the method used with the present system. System operation is best understood by viewing FIGS. 2A and 2B in conjunction with one another. As shown in FIGS. 2A/2B, incident light 220, from a scene to be imaged, passes through lens system 222, where the resultant wavefront-coded intermediate image 235 is captured by sensor 230. Image processing 272, using an algorithm 265 appropriate for optical device 250, is then performed to generate a final image 275 having extended depth-of-field, as explained in detail below with respect to FIG. 4.

Figure 3A:
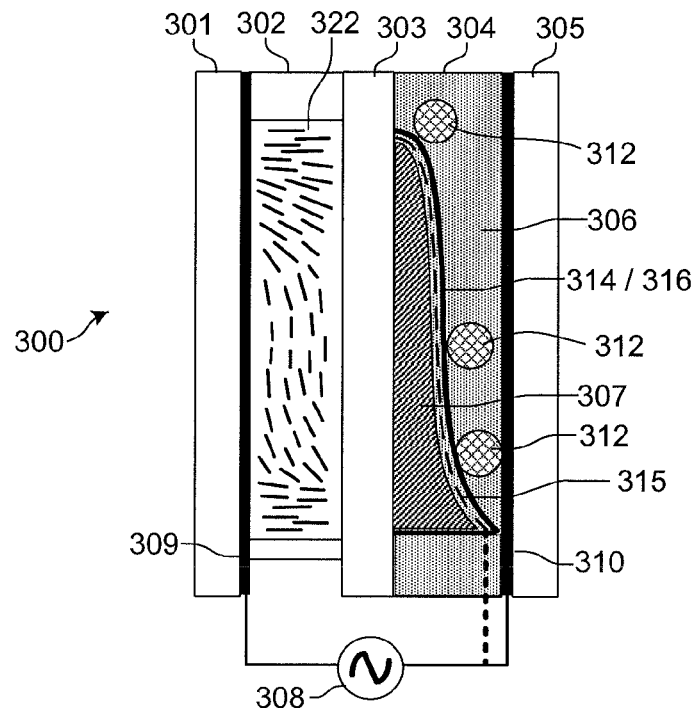
FIG. 3A is a diagram showing details of an exemplary optical device for providing variable controllable amounts of EDOF, in accordance with one embodiment of the present optical system.

FIG. 3A is a diagram showing details of an exemplary optical device 300 for providing controllable amounts of extended depth-of-field (EDOF), in accordance with one embodiment of the present optical system. As shown in FIG. 3A, in one embodiment, the present tunable-EDOF liquid crystal optical device (hereinafter 'optical device') 300 includes two optically transparent substrates 301/303 defining a cell gap 302 in which is located a liquid crystal layer 322. By varying the voltage applied to electrodes 309/310 (or 315) by power source 308 (at a nominal frequency of, for example, 1 kHz), an electric field is induced in LC layer 322 that is shaped proportionally with respect to the shape of the phase mask 307 in layer 304. Electrodes 309/310 are made of transparent conductive material (e.g., ITO) provided on the inner surface of substrates 301 and 305, respectively.

Layer 304 is defined between optically transparent substrates 303 and 305, and includes a phase mask 307. Phase mask 307 is a specially-shaped element made of optically transparent dielectric material, such as NOA 61, having a surface mating with optically transparent index-matching layer 306, which is characterized by a refractive index substantially matching that of phase mask 307 but with substantially mismatched dielectric constants. In one embodiment, index-matching layer 306 is formed from Opti-tec 5012.

Phase mask 307 is formed against alignment layer 314 provided by the inner edge (facing phase mask 307) of optically transparent substrate 316, which may be supported by one or more optional rigid, inner-cell spacers 312. Alignment layer 314 may be made from an appropriate transparent material such as SiOx or Polyimide. Substrate 316 may be a flexible sheet formed into a suitable non-planar shape to provide alignment layer 314. An optional intermediate, optically transparent, electrode 315 (shown by a dashed line) may be provided on alignment layer 314 of substrate 316 in lieu of electrode 310.

In the embodiment shown in FIG. 3A, the present optical device 300 is fabricated in a manner similar to that of tunable lens 100 (shown in FIG. 1), and uses wavefront-coded signal processing to provide variable amounts and ranges of EDOF in accordance with the process shown in FIG. 4, described below.

Figure 3B:
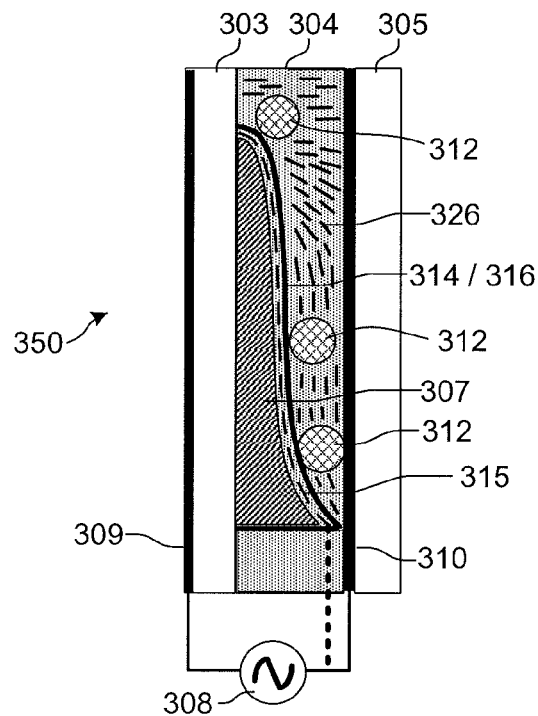
FIG. 3B is a diagram showing details of an exemplary optical device for providing variable controllable amounts of EDOF, in accordance with another embodiment of the present optical system.

FIG. 3B is a diagram showing details of an exemplary optical device 350 for providing controllable amounts of EDOF, in accordance with another embodiment of the present optical system. Optical device 350 is similar to optical device 300 (FIG. 3A) except for substrate 301 and gap 302/LC layer 322, which are eliminated, with the LC layer 326 in optical device 350 replacing layer 306 in optical device 300. LC Layer 326 corresponds functionally to LC layer 322 in optical device 300. Modulation of optical device 350 is performed by controlling the amplitude and/or frequency of the signal applied to electrodes 109/110 (or, alternatively, electrodes 115) via power source 108. Preferably, but not necessarily, phase mask 307 has an index of refraction that matches $n_o$, the ordinary index of refraction of LC layer 326.

Optical device 350 may be fabricated in the same manner as that described with respect to the devices shown in FIGS. 1 and 3A, or in the alternative embodiment described above with respect to device 300.

Figure 3C:
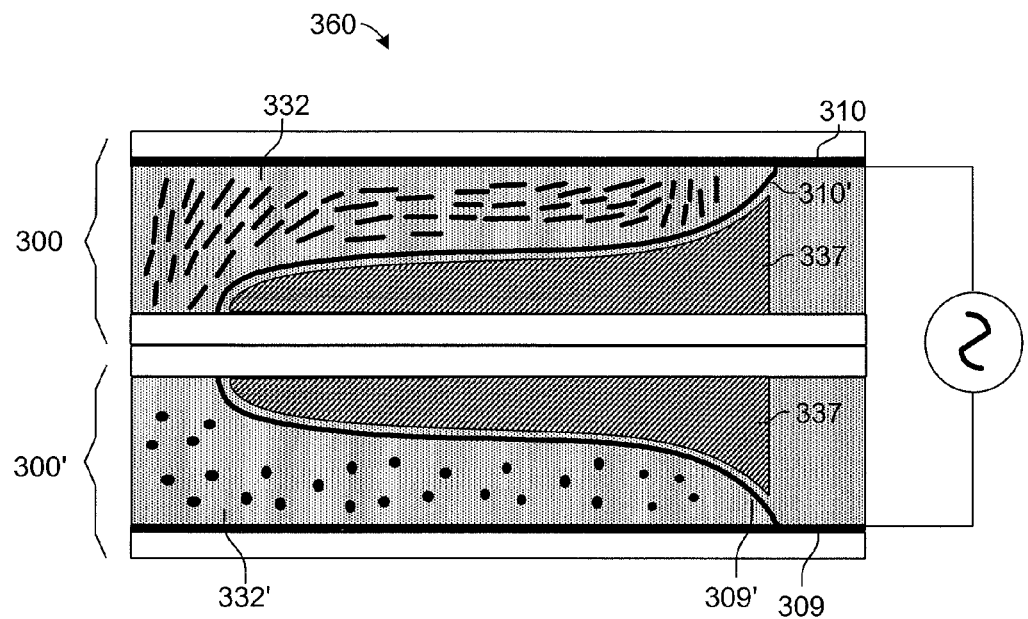
FIG. 3C is a diagram showing details of an exemplary optical device in another embodiment of the present optical device.

FIG. 3C is a diagram showing details of an exemplary optical device 360 for providing variable controllable amounts of EDOF, in accordance with another embodiment of the present optical system. Optical device 360 comprises two optical devices 300/300', each of which is similar to device 300 of FIG. 3B, with phase masks 337 corresponding to masks 307, and LC layers 332 and 332' corresponding to LC layer 322 in device 300. As shown in FIG. 3B, two devices 300 are disposed adjacent to one another; more specifically, each device 300 is oriented with respect to the other such that the planar sides of phase masks 337 are facing one another. In the present embodiment, liquid crystal (LC) layers 332 and 332' are poled (i.e., their molecules are aligned along a preferred axis), and the layers are oriented with respect to one another such that the liquid crystal structures in the two layers are poled orthogonally to one another (as indicated by the dashed and dotted symbols respectively). This relative orientation of the LC layers 332' and 332" has the advantage of allowing the device to function with light of any polarization or, more commonly, unpolarized light.

Focusing of lens 360 is performed by controlling the amplitude of the signal applied to electrodes 309/310 (or, alternatively, electrodes 309'/310') via power source 108. Device 360 may be fabricated in the same manner as that described with respect to the devices shown in FIGS. 3A and 3B.

Figure 3D:
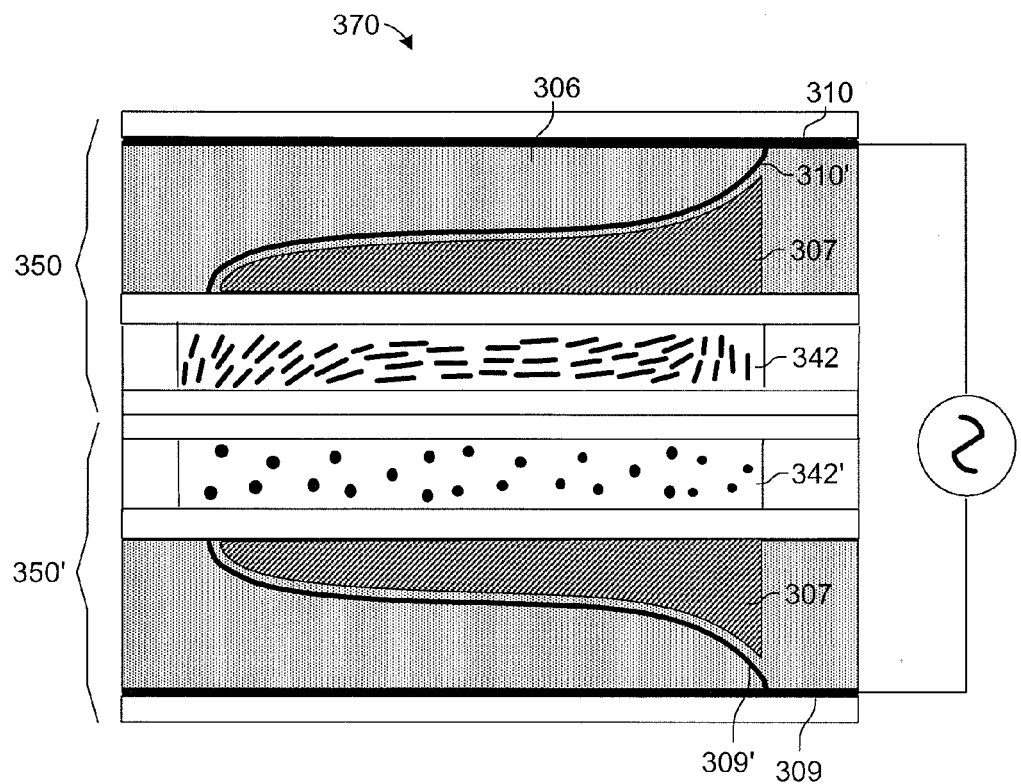
FIG. 3D is a diagram showing details of an exemplary optical device in another embodiment of the present optical device.

FIG. 3D is a diagram showing details of an exemplary optical device 370 for providing variable controllable amounts of EDOF, in accordance with another embodiment of the present optical system. Optical device 370 comprises two optical devices 350/360', each of which is similar to device 300 of FIG. 3B. As shown in FIG. 3D, optical device 370 comprises two devices 350 and 350', with each device 350 and 350' disposed adjacent to the other, as in device 360 described above. Liquid crystal (LC) layers 342 and 342' are oriented with respect to one another such that the liquid crystal structures in the two layers are poled orthogonally to one another (as indicated by the dashed and dotted symbols).

Wavefront modulation of 370 is performed by controlling the amplitude or frequency of the signal applied to electrodes 309/310 (or, alternatively, electrodes 309'/310') via power source 108. The device shown in FIG. 3B may be fabricated in the same manner as that described with respect to device 360 shown in FIG. 3C.

Figure 4:
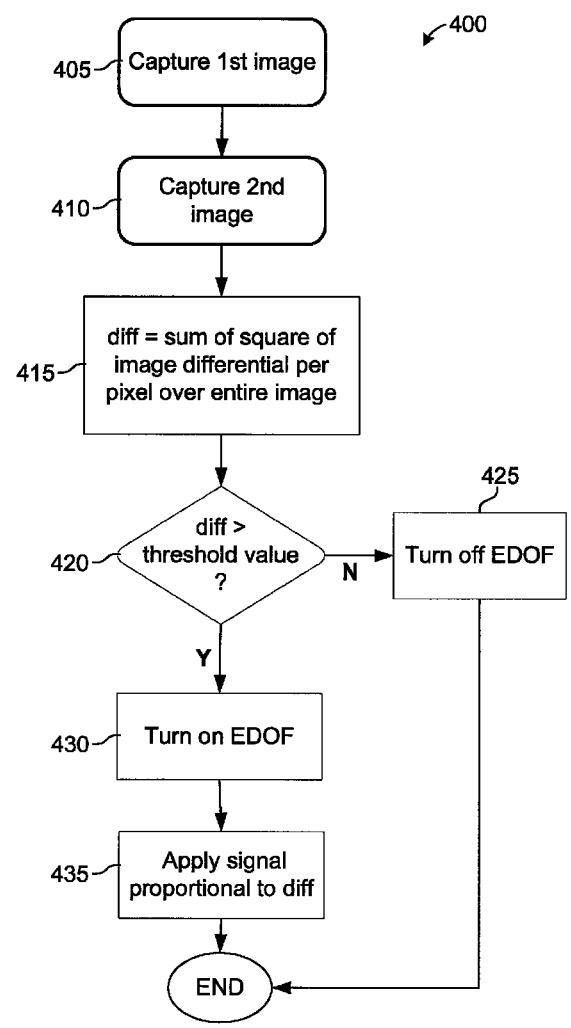
FIG. 4 is a flowchart showing an exemplary set of steps performed in processing a wavefront-coded image using a camera with variable EDOF.

FIG. 4 is a flowchart showing an exemplary set of steps performed in generating a variable EDOF via a wavefront-coded image. The procedure shown in FIG. 4 is for a device (e.g., a camera) with variable EDOF, with no auto-focus employed, and is described in the context of imaging system (camera) 200 shown in FIG. 2). At step 405, a first image is captured with sensor 230, and stored in local memory 260. At step 410, a second image of the same basic scene as the first image is captured after delay $t_{exp}$, where $t_{exp}$ is preferably nearly the same as the exposure time to be used when capturing the final image. The second image is also stored in image memory 260

At step 415 the difference between the two images is estimated. For example, this can be accomplished, as shown in Equation 2, below, by calculating the sum of the square of the image signal level differential (between the first and second images) per pixel over the entire image. That is, the sum of differences, squared, is calculated over the entire image, for each corresponding pixel in the two images, where each 'difference' is the corresponding raw pixel value differential. Raw pixel values are the pixel values before color interpolation is performed and, therefore, each pixel has a value that is proportional to the localized light irradiance.

$$\text{diff} = \Sigma_{i,j}[\text{Image}_1(i,j) - \text{Image}_2(i,j)]^2 \qquad \text{Equation 2}$$

where $\text{Image}_1(i,j)$ refers to the value of the pixel at coordinates i and j of the first image.

At step 420, if duff>threshold$_1$ (in the case of a fast-moving image, the EDOF function is turned on at step 430 [for example, Diff>(½ number of pixels in the image*max. pixel value)$^2$]. At step 435, a drive signal voltage is generated (applied to the EDOF device) which is proportional to diff. That is, the voltage applied to the EDOF device is proportional to the signal intensity calculated in Equation 2:

$$V_{EDOF} = k_1 \cdot \text{diff}$$

A typical lens drive signal voltage level is 28V, with a frequency in the range from 100 Hz to 100 kHz. At step 420, if diff>threshold$_1$, at step 425, the EDOF function is turned off ($V_{EDOF}=0$).

The following procedure is applicable to a device having both auto-focus and variable EDOF. Initially, the EDOF function is turned off. Auto-focus is then performed to find best focus positions, $d_1$ and $d_2$, for respective sequential exposures. If the difference (diff$_1$) between best focus positions $d_1$ and $d_2$ [diff$_1$=abs($d_1$−$d_2$)] is greater than a predetermined threshold value, then the EDOF function is turned on, and has a value calculated by:

$$V_{EDOF} = k_1 \cdot \text{diff}_1, \text{ where } k_1 \text{ is determined empirically.}$$

Next, an average focus position, $d_{av}$, is calculated as $(d_1+d_2)/2$, and the auto-focus position is set to $d_{av}$ (that is, $V_{AF}=k_2 \cdot d_{av}$).

There are numerous auto-focus methods used with different digital cameras. Regardless of the particular auto-focus method, each of these methods returns a value that is proportional to the object distance and/or to the voltage applied to an actuator that modifies the camera's focus. The returned value is simply a number at this point. If the values for $d_1$ and $d_2$ are substantially the same, then the focus position is assumed to not have changed significantly between the sequential exposures. Otherwise, a change in focus occurred, and therefore the EDOF function can be used advantageously.

Figure 5:
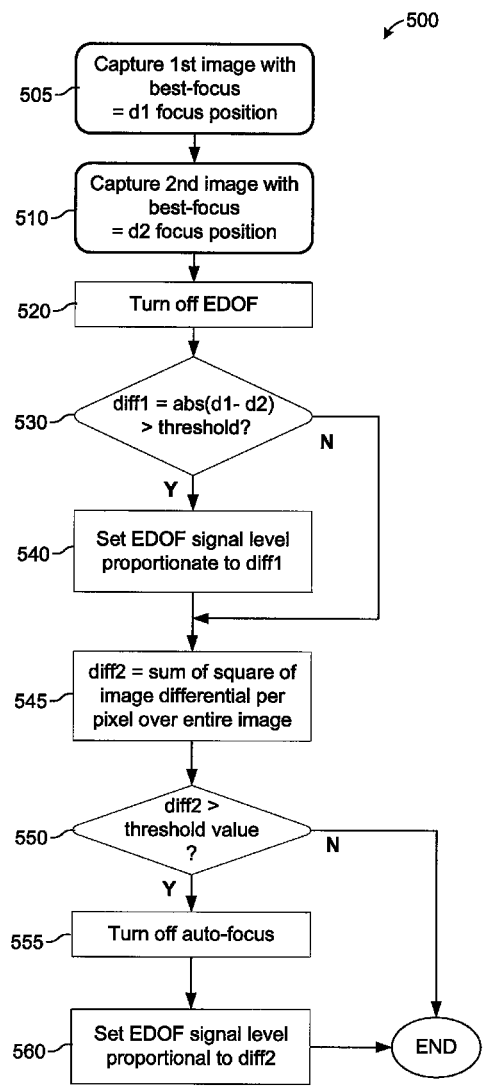
FIG. 5 is a flowchart showing an exemplary set of steps performed in setting a device having both auto-focus and EDOF functions.

FIG. 5 is a flowchart showing an alternative method for setting a device having both auto-focus and EDOF functions. As shown in FIG. 5, at step 505, auto-focus is performed and image$_1$ (a by-product of auto-focus) is captured, and 'best focus' position $d_1$ is saved. At step 510, auto-focus is performed, Image$_2$ is captured, and 'best focus' position $d_2$ is saved. The EDOF function is then turned off ($V_{EDOF}=0$) at step 520.

At step 530, if the difference, diff$_1$, between best focus positions $d_1$ and $d_2$[diff$_1$=abs($d_1$−$d_2$)] is greater than a predetermined threshold value, then at step 540, the EDOF function is turned on, and the drive signal voltage ($V_{EDOF}$) is set to a predefined constant ($k_1$) times this difference:

$$\text{if abs}(d_1-d_2)[=\text{diff}_1] > \text{threshold}_1, V_{EDOF}=k_1 \cdot \text{diff}_1$$

At step 545, the sum of the square of the image signal level differential between the first and second images per pixel over the entire image (Diff$_2$) is calculated using Equation 3, below:

$$\text{diff}_2 = \Sigma_{i,j}[\text{Image}_1(i,j) - \text{Image}_2(i,j)]^2 \qquad \text{Equation 3}$$

If diff$_2$ is greater than a predetermined threshold value (step 550), then at step 555, auto-focus is turned off (i.e., auto-focus is not used if an imaged object is moving rapidly), and the EDOF function has a value calculated (at step 560) by:

$$V_{EDOF}=k_1 \text{diff}_1, \text{ where } k_1 \text{ is determined empirically.}$$

User-selectable modes for operation of a camera, such as that shown in FIG. 2A, may be handled as follows. If a user selects an 'action' mode, then auto-focus is turned off, and $V_{EDOF}$ is set to a maximum level. If the user selects 'portrait' mode, then $V_{EDOF}$ is set to 0, and $V_{AF}$ is set to $k_2 \cdot d_{av}$. In 'landscape' mode, the EDOF function should generally be turned off, with primary focus set to infinity.

Certain changes may be made in the above methods and systems without departing from the scope of that which is described herein. It is to be noted that all matter contained in the above description or shown in the accompanying drawings is to be interpreted as illustrative and not in a limiting sense. The elements and steps shown in the present drawings may be modified in accordance with the methods described herein, and the steps shown therein may be sequenced in other configurations without departing from the spirit of the system thus described. The following claims are intended to cover all generic and specific features described herein, as well as all statements of the scope of the present method, system and structure, which, as a matter of language, might be said to fall there between.

What is claimed is:

1. A method for providing extended depth-of-field in an optical imaging system comprising:
   capturing and storing a first wavefront-coded intermediate image;
   capturing and storing a second wavefront-coded intermediate image;
   computing a difference value equal to the sum of the square of the image signal differential per pixel between the first image and the second image, over each pixel of the first and second intermediate images;
   generating an image with a variable extended depth-of-field by processing the second intermediate image using a wavefront-coded processing technique when the difference value is greater than a predetermined threshold value.

2. The method of claim 1, wherein the variable extended depth-of-field is provided by a system comprising:
   an optically transparent liquid crystal layer;
   an optically transparent dielectric phase mask, optically aligned with the liquid crystal layer and separated therefrom by an optically transparent substrate;
   an optically transparent dielectric index-matching layer, disposed adjacent to one surface of the phase mask, and having a refractive index substantially matching that of the phase mask; and
   a pair of electrodes for generating an electric field acting on said liquid crystal layer to change the depth of field of the optical system in proportion to the amplitude of a signal applied to the electrodes, wherein the liquid crystal layer and the phase mask are disposed between the pair of electrodes.

3. The method of claim 2, wherein the phase mask is a wavefront-coded element.

4. The method of claim 3, wherein the wavefront-coded element is a cubic phase element.

5. The method of claim 2, wherein an image captured with the imaging system is processed to generate a modified image with said extended depth-of-field.

6. The method of claim 2, wherein the phase mask comprises an optical adhesive with dielectric properties.

7. The method of claim 6, wherein the optical adhesive is Norland Optical Adhesive 61.

8. The method of claim 2, wherein the index-matching layer comprises a dielectric material.

9. The method of claim 8, wherein the dielectric material is Opti-tec 5012.

10. The method of claim 2, wherein the dielectric constant of the phase mask is significantly less than that of the index-matching layer.

11. The method of claim 2, wherein the depth of field is variable in proportion to the frequency of the applied signal.

12. The method of claim 2 placed substantially close to the pupil plane of an imaging system, further comprising a sensor, disposed proximate the image plane of the imaging system, for capturing an image acquired thereby;
a power source for supplying the signal applied to the electrodes; and
a processor for (i) processing an algorithm used to generate, from an initially acquired image, a modified image having extended depth of field, and for (ii) controlling the amplitude of the signal generated by the power source to control the depth-of-field of the modified image.

13. The method of claim 1, wherein the variable extended depth-of-field is provided by a system comprising:
   an optically transparent dielectric phase mask;
   an optically transparent liquid crystal layer, disposed adjacent to one surface of the phase mask; and
   a pair of electrodes for generating an electric field acting on said liquid crystal layer to change the depth of field of the optical system in proportion to the amplitude of a signal applied to the electrodes, wherein the phase mask is disposed between the pair of electrodes.

14. The method of claim 13, wherein the phase mask is a wavefront-coded element.

15. The method of claim 14, wherein the wavefront coded element is a cubic phase element.

16. The method of claim 13, wherein an image captured with the imaging system is processed to generate a modified image with said extended depth-of-field.

17. The method of claim 1, wherein the variable extended depth-of-field is provided by a system comprising:
   first and second optical assemblies, each comprising:
      an optically transparent phase mask having one planar side; and
      an optically transparent liquid crystal layer, disposed adjacent to one surface of the phase mask;
   wherein the liquid crystals in the liquid crystal layer are poled;
   wherein the first and second optical assemblies are adjacently disposed such that the planar sides of the phase masks therein are facing each other and the liquid crystals in the liquid crystal layers are in a mutually orthogonal alignment; and
   a pair of electrodes for generating an electric field acting on the liquid crystal layer in each of the optical assemblies to change the depth of field of the imaging system in proportion to the amplitude of a signal applied to the electrodes,
   wherein the phase mask in each of the assemblies is disposed between the pair of electrodes.

18. The method of claim 17, wherein an image captured with the system in the pupil plane of an imaging system is processed to generate a modified image with said extended depth-of-field.

19. The method of claim 17, wherein the phase mask comprises an optical adhesive with dielectric properties.

20. The method of claim 17, wherein the optical adhesive is Norland Optical Adhesive 61.

21. The method of claim 17, wherein the index-matching layer comprises a dielectric material.

22. The method of claim 21, wherein the dielectric material is Opti-tec 5012.

23. The method of claim 17, wherein the dielectric constant of the phase mask is significantly different from that of the index-matching layer.

24. The method of claim 17, wherein the depth of field is variable in proportion to the frequency of the applied signal.

25. The method of claim 1, wherein the variable extended depth-of-field is provided by a system comprising:

first and second optical assemblies, each comprising:
an optically transparent liquid crystal layer;
an optically transparent phase mask, optically aligned with the liquid crystal layer and separated therefrom by an optically transparent substrate;
an optically transparent index-matching layer, disposed adjacent to one surface of the phase mask;
wherein the first and second optical assemblies are adjacently disposed such that planar sides of the phase masks therein are facing each other and the liquid crystals in the liquid crystal layers are poled in mutually orthogonal alignment; and
a pair of electrodes for generating an electric field acting on the liquid crystal layer in each of the optical assemblies to change the depth of field of the imaging system in proportion to the amplitude of a signal applied to the electrodes,
wherein the phase masks and the liquid crystal layers of the assemblies are disposed between the pair of electrodes.

26. The method of claim 25, wherein the phase mask comprises an optical adhesive with dielectric properties.

27. The method of claim 25, wherein an image captured with the system in the pupil plane of an imaging system is processed to generate a modified image with said extended depth-of-field.

28. The method of claim 25, wherein the phase mask comprises an optical adhesive with dielectric properties.

29. The method of claim 28, wherein the optical adhesive is Norland Optical Adhesive 61.

30. The method of claim 25, wherein the index-matching layer comprises a dielectric material.

31. The method of claim 30, wherein the dielectric material is Opti-tec 5012.

32. The method of claim 25, wherein the dielectric constant of the phase mask is significantly less than that of the index-matching layer.

33. The method of claim 25, wherein the depth of field is variable in proportion to the frequency of the applied signal.

34. The method of claim 1, wherein the variable extended depth-of-field is provided by a system comprising:
an optically transparent liquid crystal layer;
an optically transparent phase mask, optically aligned with the liquid crystal layer and separated therefrom by an optically transparent substrate;
an optically transparent index-matching layer, disposed adjacent to one surface of the phase mask;
a pair of electrodes for generating an electric field acting on said liquid crystal layer to change the depth of field of the imaging system;
wherein the liquid crystal layer and the phase mask are disposed between the pair of electrodes; and
a processor for executing an image processing algorithm to provide a recovered image;
wherein the processor executes the algorithm to process a wavefront-coded image captured by the imaging system to generate the recovered image with an extended depth-of-field proportional to the amplitude of a signal applied to the electrodes.

35. The method of claim 1, wherein the variable extended depth-of-field is provided by a system comprising:
an optically transparent phase mask;
an optically transparent liquid crystal layer, disposed adjacent to one surface of the phase mask, and having a refractive index substantially matching that of the phase mask; and
a pair of electrodes for generating an electric field acting on said liquid crystal layer to change the depth of field of the imaging system in proportion to the amplitude of a signal applied to the electrodes, wherein the phase mask is disposed between the pair of electrodes;
memory for storing an image processing algorithm; and
a processor for executing the image processing algorithm to provide a recovered image;
wherein the processor executes the algorithm to process a wavefront-coded image captured by the imaging system to generate the recovered image with an extended depth-of-field proportional to the amplitude of a signal applied to the electrodes.

36. The method of claim 35, further comprising memory for storing at least one of the algorithm, the wavefront-coded image, and the recovered image.

37. A method for providing extended depth-of-field in an optical imaging system comprising:
capturing a wavefront-coded intermediate image with a lens system;
wherein the lens system comprises:
an imaging lens assembly
an optically transparent dielectric phase mask placed in the aperture stop of said lens assembly;
an optically transparent liquid crystal layer; and
a pair of electrodes for generating an electric field acting on said liquid crystal layer to change the depth of field of the imaging system in proportion to the amplitude of a signal applied to the electrodes;
using a deconvolution kernel which varies as a function of a characteristic of the signal applied to the lens system to decode the wavefront-coded image;
determining a signal characteristic vs. deconvolution kernel mapping function by measuring the point-spread function of the lens system as a function of a characteristic of the applied signal;
applying a filter, comprising the amplitude vs. deconvolution kernel mapping function, to the intermediate image to generate an image having extended depth-of-field.

38. The system of claim 37, wherein the characteristic is the signal amplitude.

39. The system of claim 37, wherein the characteristic is the signal frequency.

40. The method of claim 37, wherein the filter is a Wiener filter.

* * * * *